United States Patent
Kagawa (10) Patent No.: US 7,957,646 B2
(45) Date of Patent: Jun. 7, 2011

(54) OPTICAL TIME DIVISION MULTIPLEXING TRANSMITTER

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1548 days.

(21) Appl. No.: 11/330,265

(22) Filed: Jan. 12, 2006

(65) Prior Publication Data

US 2006/0159458 A1 Jul. 20, 2006

(30) Foreign Application Priority Data

Jan. 14, 2005 (JP) ................... 2005-008089

(51) Int. Cl.
*H04B 10/04* (2006.01)
*H04B 10/152* (2006.01)
*H04B 10/06* (2006.01)
*G02F 1/01* (2006.01)
*G02F 1/13* (2006.01)

(52) U.S. Cl. .............. 398/75; 398/98; 398/99; 398/101; 398/186

(58) Field of Classification Search .................... 398/75, 398/74, 73, 186
See application file for complete search history.

(56) References Cited

U.S. PATENT DOCUMENTS

| | | | | |
|---|---|---|---|---|
| 5,995,255 A * | 11/1999 | Giles | ................................ | 398/34 |
| 6,532,091 B1 * | 3/2003 | Miyazaki et al. | ............. | 398/175 |
| 6,809,849 B2 | 10/2004 | Akiyama et al. | | |
| 6,868,102 B2 | 3/2005 | Brindel | | |
| 6,920,262 B2 * | 7/2005 | Van Tuyl | ......................... | 385/24 |
| 7,174,103 B2 * | 2/2007 | Nishiki et al. | .................. | 398/77 |
| 7,224,902 B2 * | 5/2007 | Nishiki | ............................ | 398/87 |
| 7,535,647 B1 * | 5/2009 | Otten et al. | .................... | 359/634 |
| 7,574,139 B2 * | 8/2009 | Fu et al. | ........................... | 398/98 |
| 2001/0017721 A1 * | 8/2001 | Hait | .............................. | 359/123 |
| 2003/0058495 A1 * | 3/2003 | Brindel | ......................... | 359/123 |
| 2003/0095263 A1 * | 5/2003 | Varshneya et al. | ............. | 356/477 |
| 2003/0118346 A1 * | 6/2003 | Umeno et al. | ................ | 398/140 |

(Continued)

FOREIGN PATENT DOCUMENTS

JP 2002-281095 9/2002

(Continued)

OTHER PUBLICATIONS

Kagawa Translation.*

*Primary Examiner* — Ken N Vanderpuye
*Assistant Examiner* — Oommen Jacob
(74) *Attorney, Agent, or Firm* — Rabin & Berdo, PC (57) ABSTRACT

The optical time division multiplexer generates a time-division-multiplexed optical signal by time-division-multiplexing optical signals of a plurality of channels, the carrier-wave phases of which are shifted with respect to one another. The circulator guides the multiplexed optical signals split by the optical splitter to the optical interference device and the superimposed light outputted from the optical interference device is guided to the optical intensity detector. The optical interference device extends the pulse width of the multiplexed optical signal to a width equal to or more than the bit interval and superimposes the extended light of an adjacent bit onto the extended light. The optical intensity detector detects the intensity of the superimposed light outputted by the optical interference device. The temperature regulator controls the temperature of the modulator so that the phase difference of the carrier waves constituting the optical signal trains is to be a half wavelength.

4 Claims, 8 Drawing Sheets

U.S. PATENT DOCUMENTS

| | | | |
|---|---|---|---|
| 2003/0156296 A1* | 8/2003 | Englund et al. | 356/477 |
| 2003/0194165 A1* | 10/2003 | Silberberg et al. | 385/11 |
| 2004/0076439 A1* | 4/2004 | Lee et al. | 398/183 |
| 2004/0091262 A1* | 5/2004 | Pohjola et al. | 398/42 |
| 2004/0120628 A1* | 6/2004 | Tuyl | 385/11 |
| 2004/0131089 A1* | 7/2004 | Uemura et al. | 370/537 |
| 2004/0165246 A1* | 8/2004 | Carlson et al. | 359/245 |
| 2004/0179841 A1* | 9/2004 | Shahar | 398/75 |
| 2004/0179842 A1* | 9/2004 | Futami et al. | 398/75 |
| 2004/0190910 A1* | 9/2004 | Akiyama et al. | 398/186 |
| 2005/0195400 A1* | 9/2005 | Anderson et al. | 356/454 |
| 2005/0226312 A1* | 10/2005 | Koslar et al. | 375/142 |
| 2006/0077396 A1* | 4/2006 | Park | 356/500 |
| 2006/0115195 A1* | 6/2006 | Kobayashi et al. | 385/1 |
| 2006/0159458 A1* | 7/2006 | Kagawa | 398/75 |
| 2007/0019210 A1* | 1/2007 | Kuhn et al. | 356/512 |
| 2007/0086787 A1* | 4/2007 | Cho et al. | 398/183 |
| 2009/0034988 A1* | 2/2009 | Akiyama et al. | 398/198 |
| 2009/0207401 A1* | 8/2009 | Ozcan et al. | 356/73.1 |

FOREIGN PATENT DOCUMENTS

| | | |
|---|---|---|
| JP | 2003-152650 | 5/2003 |
| JP | 2003-279912 | 10/2003 |
| JP | 2004-23537 | 1/2004 |
| JP | 2004023537 A * | 1/2004 |
| JP | 2005-6175 | 1/2005 |
| JP | 2005-6176 | 1/2005 |
| JP | 2006-197378 | 7/2006 |
| JP | 3913252 | 5/2007 |

* cited by examiner

| logic | matched in phase | opposite in phase |
|---|---|---|
| 1111 | $12x + 4y$ | 0 |
| 1110 | $\frac{17}{2}x + 4y$ | $\frac{1}{2}x$ |
| 1101 | $\frac{11}{2}x + y$ | $\frac{3}{2}x + y$ |
| 1100 | $4x + y$ | 1 |
| 1011 | $\frac{11}{2}x + y$ | $\frac{3}{2}x + y$ |
| 1010 | $3x + y$ | $3x + y$ |
| 0111 | $\frac{17}{2}x + 4y$ | $\frac{x}{2}$ |
| 0110 | $5x + 4y$ | $x$ |
| 0000 | 0 | 0 |
| 0001 | $\frac{1}{2}x$ | $\frac{1}{2}x$ |
| 0010 | $\frac{3}{2}x + y$ | $\frac{3}{2}x + y$ |
| 0011 | $4x + y$ | 1 |
| 0100 | $\frac{3}{2}x + y$ | $\frac{3}{2}x + y$ |
| 0101 | $3x + y$ | $3x + y$ |
| 1000 | $\frac{1}{2}x$ | $\frac{1}{2}x$ |
| 1001 | $x$ | $x$ |

OPTICAL TIME DIVISION MULTIPLEXING TRANSMITTER

BACKGROUND OF THE INVENTION

1. Field of the Invention

The present invention relates to a transmitter that employs an OTDM (Optical Time Division Multiplexing) system and a CS (Carrier-Suppressed)-RZ (Return to Zero) modulation system. More precisely, the present invention relates to technology for detecting and adjusting a carrier-wave phase shift in an optical time division multiplexing device that employs an optical time division multiplexing system and a CS-RZ modulation system.

2. Description of Related Art

Conventionally, optical time division multiplexing systems are known as signal multiplexing technology suitable for high-speed, high-capacity optical transmission systems. In addition, CS-RZ modulation systems are known as modulation technology suited to such optical transmission systems.

Optical time division multiplexing systems are systems for multiplexing optical signals of a plurality of channels by switching the transmission channel at fixed times. Optical signals of two channels can be multiplexed by switching the transmission channel for each one-bit cycle, for example.

The CS-RZ modulation system is a modulation system produced by adding CS technology to an RZ system. An RZ system is a system in which an area with a signal value of zero is provided between each of the signal bits. On the other hand, a system in which a zero area is not provided is known as a NRZ (Non Return to Zero) system. An RZ system has the advantage that timing control is simple in comparison with that of an NRZ system. Meanwhile, CS technology is technology in which the phase of the carrier wave is shifted by a half wavelength between adjacent signal bits. When there is an overlap between adjacent signal bits A and B, the optical intensity of the mixed signal component C of the overlapping part increases most when the phases of the carrier waves forming the signal bits match and the phases cancel each other out most when the phases are shifted by a half wavelength. Therefore, the optical intensity of parts where the adjacent signal bits overlap can be reduced by shifting the carrier-wave phases of adjacent signal bits by a half wavelength and, therefore, the complete separation of these signal bits (that is, obtaining an RZ-system signal waveform) become easy. In a high-speed, high-capacity optical transmission system, the signal-bit interval is desirably shortened. Therefore, CS technology is effective when the RZ system is adopted for such a high-speed, high-capacity optical transmission system.

In order to combine the above optical time division multiplexing system and the CS-RZ system, the signals of the respective channels may be formed from carrier waves the phases of which are shifted by a half wavelength each other. For example, if the signals of two channels is formed from carrier waves the phases of which have been shifted by a half wave, and these signals are time-division-multiplexed, the carrier-wave phases of adjacent signal bits can be always shifted by a half wave. Further, when time-division-multiplexing of four channel signals is performed, the carrier-wave phases of adjacent signal bits can be always shifted by a half wave, for example, by matching the phases of the carrier waves of the first and third channels, matching the phases of the carrier waves of the second and fourth channels and shifting the phases of the carrier waves of the first and the second by a half wave.

As is commonly known, a bit signal is generated by modulating a carrier wave by means of a Mach-Zehnder-type modulator or the like. Therefore, the phase of the carrier wave constituting the bit signal can be controlled by adjusting the timing for modulating the carrier wave. Hence, the carrier wave has an extremely high frequency and, therefore, it is not easy to control the phase of the carrier wave very accurately. In addition, the phase of the carrier wave sometimes fluctuates with a dependence on the temperature and so forth. As a result, technology for measuring the phase difference highly accurately in order to control the carrier-wave phase difference between adjacent signal bits highly accurately is desirable.

The present inventor has already proposed a technology for measuring the carrier-wave phase difference by means of Japanese Patent Application Laid-Open No. 2004-23537. In the technology of the patent application, the phase difference is measured by detecting the optical intensity by overlapping adjacent signal bits (See paragraph 0020, FIG. 1 and so forth of the Japanese application) by means of a planar optical waveguide section 310. As is clear from the above description, when adjacent signal bits are overlapped, the optical intensity of the mixed signal increases most when the phases of the carrier waves forming the signal bits match and the carrier waves cancel each other out most when the phases are shifted by a half wavelength. Therefore, by measuring the optical intensity of the superimposed signals, the phase difference between the carrier waves constituting the signal bits can be detected.

In the case of the technology of the Japanese application, the combinations when adjacent signal bits of signal light that is outputted from a transmitter 100 (See FIG. 1 of the Japanese application) are overlapped are the four types 1•1, 0•1, 1•0, and 0•0. In the following description, it is assumed that the optical intensity is '1' when the bit signal is '1' and that the optical intensity is '0' when the bit signal is '0'. When the overlapping signal bits are '1•1', the optical intensity is '4' if there is a match between the phases of the carrier waves of the two signal bits but the optical intensity is '0' if the phases of the carrier waves of the two signal bits are shifted by a half wavelength. Further, when the combined signal bits are '1•0' and '0•1', the optical intensity is '1' irrespective of the phase difference of the carrier waves. In addition, when the combined signal bits are '0•0', the optical intensity is '0' irrespective of the phase difference between the carrier waves. Therefore, supposing that the mark ratio of the signal light (the ratio that exists between '0' and '1') is ½, the average optical intensity detected by the planar optical waveguide section (the PLC section in FIG. 2 of the Japanese application) 310 is (4+1+1+0)/4=3/2 if the carrier-wave phases of the signal bits match but is (0+1+1+0)/4=½ if the carrier-wave phases of the signal bits are shifted by a half wavelength. In other words, in the technology of the Japanese application, in the case where the carrier-wave phases of the signal bits match and the case where the phases are shifted by a half wavelength, the amount of change in the optical intensity (that is, duty ratio) is three times (that is, 4.8 dB).

The optical intensity change amount is not said to be sufficiently large and it is therefore difficult to detect the carrier wave phase difference accurately.

SUMMARY OF THE INVENTION

An object of the present invention is to provide an optical time division multiplexing transmitter which can detect the carrier wave phase difference accurately.

Therefore, the optical time division multiplexing transmitter of the present invention comprises an optical time division multiplexer that generates time-division-multiplexed optical signals by time-division-multiplexing optical signals of a plurality of channels the carrier-wave phases of which are shifted with respect to one another; an optical interference device that extends the pulse width of the time-division-multiplexed optical signals to a width equal to or more than the bit interval and superimposes the extended light of an adjacent bit on the extended light; and an optical intensity detector that detects the intensity of the superimposed light outputted by the optical interference device.

BRIEF DESCRIPTION OF THE DRAWINGS

Further objects and advantages of the present invention will be described with reference to the attached drawings hereinbelow.

DESCRIPTION OF THE PREFERRED EMBODIMENTS

Embodiments of the present invention will be described hereinbelow with reference to the drawings. The size, shape and dispositional relationship of each of the constituent components in the drawings are only shown schematically to the extent of permitting an understanding of the present invention and the numerical conditions described hereinbelow are merely examples.

First Embodiment

The optical time division multiplexing transmitter of the first embodiment of the present invention will be described first by using FIGS. 1 to 7B.

Figure 1:
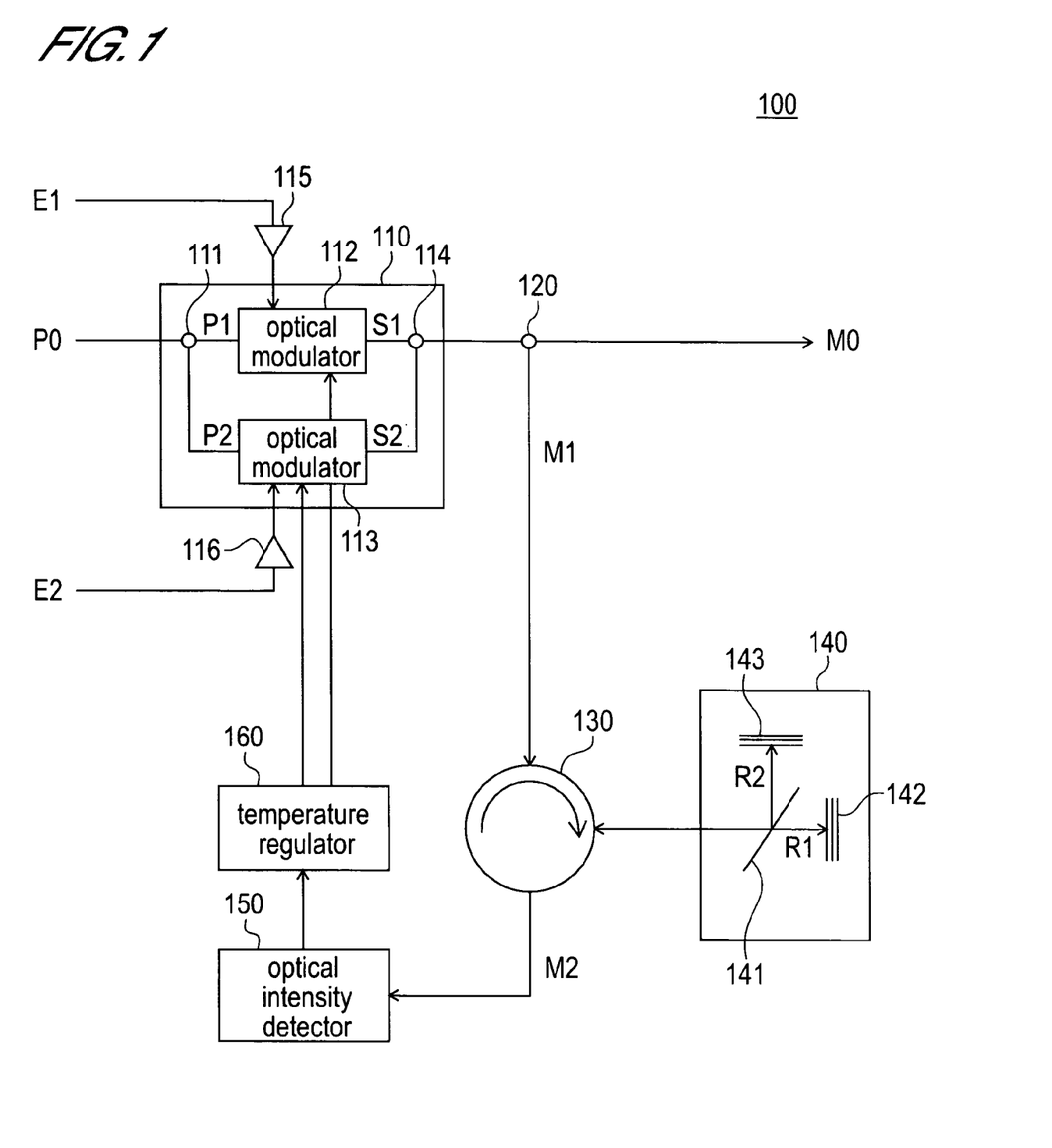
FIG. 1 is a block diagram that schematically shows the overall constitution of the optical time division multiplexing transmitter according to a first embodiment.

FIG. 1 is a block diagram that schematically shows the overall constitution of the optical time division multiplexing transmitter of this embodiment.

As shown in FIG. 1, the optical time division multiplexing transmitter 100 of this embodiment comprises an optical time division multiplexer 110, an optical splitter 120, a circulator 130, an optical interference device 140, an optical intensity detector 150, and a temperature regulator 160.

The optical time division multiplexer 110 generates a time-division-multiplexed optical signal by time-division-multiplexing the optical signals of two channels generated so that the phases of the carrier waves are shifted with respect to one another. The optical time division multiplexer 110 comprises an optical splitter 111, optical modulators 112 and 113, and an optical coupler 114. The optical splitter 111 splits an optical short-pulse train P0 inputted from the outside into the optical short-pulse trains P1 and P2. The optical modulator 112 generates an optical signal S1 by modulating the optical short-pulse train P1 in accordance with the electrical pulse signal E1 that is inputted via an electrical buffer 115. Likewise, the optical modulator 113 generates an optical signal S2 by modulating the optical short-pulse train P2 in accordance with an electrical pulse signal E2 that is inputted via an electrical buffer 116. The optical modulators 112 and 113 have a function to control the temperature of an internal optical waveguide section (not shown) in accordance with a control signal from the temperature regulator 160. By controlling the temperature of the optical waveguide section, the refractive index of the optical waveguide section can be controlled and, as a result, the carrier-wave phases of the optical signals S1 and S2 can be controlled. The optical coupler 114 generates a time-division-multiplexed optical signal M0 by coupling the optical signals S1 and S2 of two channels.

The optical splitter 120 splits a portion M1 of the time-division-multiplexed optical signal M0 that is outputted from the optical time division multiplexer 110.

The circulator 130 guides the time-division-multiplexed optical signal M1 split by the optical splitter 120 to the optical interference device 140 and guides the superimposed light M2 that is outputted from the optical interference device 140 to the optical intensity detector 150.

The optical interference device 140 extends the pulse width of the time-division-multiplexed optical signal M1 to a width equal to or more than the bit interval and superimposes the extended light of an adjacent bit onto this extended light. The superimposed extended light is guided to the circulator 130 as superimposed light M2. The optical interference device 140 of this embodiment comprises a half mirror 141 and first and second multi-beam interferometers 142 and 143. The half mirror 141 splits the time-division-multiplexed optical signal M1 into two. The first multi-beam interferometer 142 generates extended light R1 from one of the split time-division-multiplexed optical signals and sends the extended light R1 back to the half mirror 141. The second multi-beam interferometer 143 generates extended light R2 from the other of the split time-division-multiplexed optical signals and sends the extended light R2 back to the half mirror 141. The round-trip optical path length between the half mirror 141 and the first multi-beam interferometer 142 is established shorter than the round-trip optical path length between the half mirror 141 and the second multi-beam interferometer 143 by one bit interval's worth of the time-division-multiplexed optical signal M1. The detailed structure and principle of the optical interference device 140 will be described subsequently by using FIGS. 2 to 7B.

The optical intensity detector 150 detects the intensity of the superimposed light M2 outputted by the optical interference device 140.

The temperature regulator 160 corresponds to the 'regulator' of the present invention and controls the temperature of the modulators 112 and 113 so that the phase difference of the carrier waves constituting the optical signals S1 and S2 becomes a half wavelength in accordance with the detection result of the optical intensity detector 150.

The optical interference device 140 will be described in detail next by using FIGS. 2 to 7B.

Figure 2:
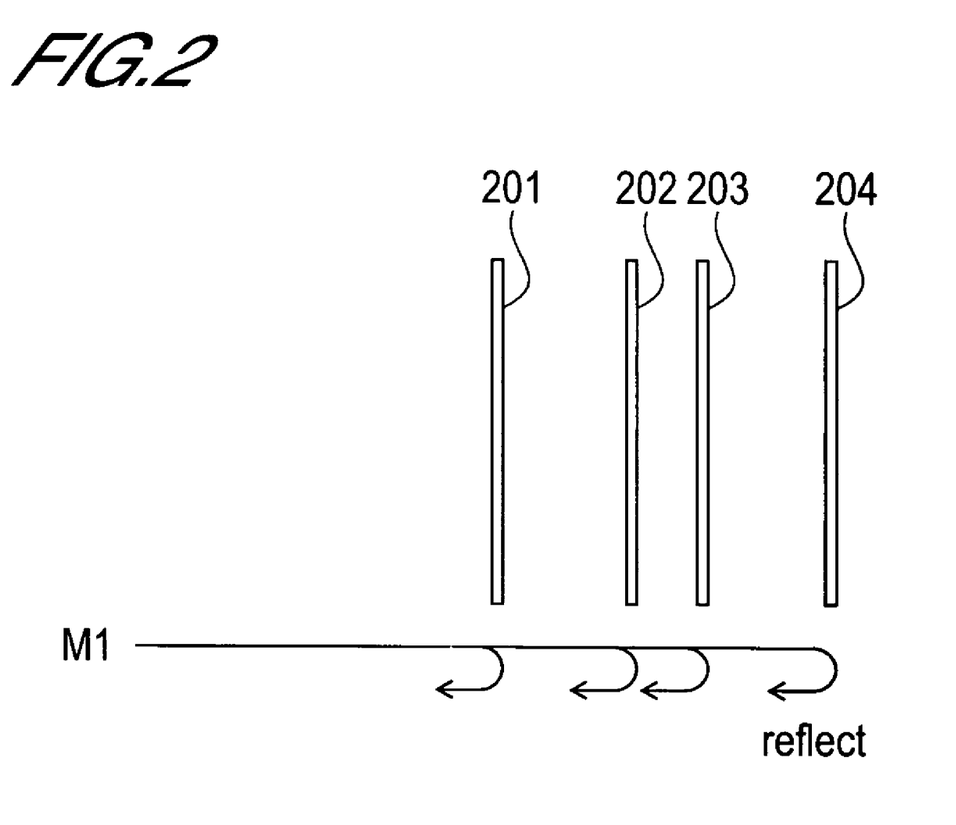
FIG. 2 is a conceptual view of the structure of an interferometer according to the first embodiment.

FIG. 2 is a conceptual view of the structure of the first multi-beam interferometer 142. The structure of the second multi-beam interferometer 143 is also entirely the same as the structure of the first multi-beam interferometer 142. As shown in FIG. 2, the multi-beam interferometer 142 comprises a plurality of reflective faces 201, 202, 203, and 204 (four faces in the example of FIG. 2) that are arranged vertically in the optical axis direction of the time-division-multiplexed optical signal M1. The reflectance of each of the reflective faces 201 to 204 is 0.375, 0.2, 0.25, and 1, for example. Because an anti-reflection film is formed on the rear side of the reflective face 204, multiple reflections can be ignored. When the bit rate of the time-division-multiplexed optical signal M1 is 80 Gbit per second, for example, the temporal distance between the reflective faces 201 and 202 is set at 2.25 picoseconds, for example, the temporal distance between the reflective faces 202 and 203 is set at 2.75 picoseconds, for example, and the temporal distance between the reflective faces 203 and 204 is set at 5 picoseconds, for example. These temporal distances are each 0.675 mm, 0.825 mm, and 1.5 mm when converted into actual distances in a vacuum.

Figure 3:
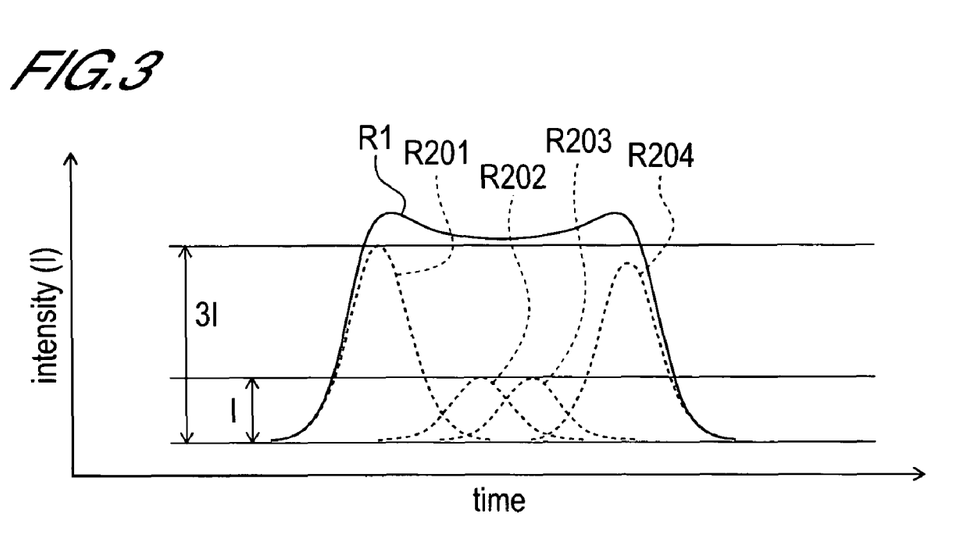
FIG. 3 is a conceptual view that serves to illustrate the operation of the interferometer according to the first embodiment.

FIG. 3 is a conceptual view of the intensity distribution of the signal light reflected by the reflective faces 201 to 204. In FIG. 3, the vertical axis represents the optical intensity and the horizontal axis represents time. As is clear from FIG. 3, a portion of the signal pulse of the time-division-multiplexed optical signal M1 is reflected by the reflective faces 201 to 204 and the remainder is transmitted. In FIG. 3, the reflected light of the reflective faces 201, 202, 203, and 204 is denoted by the codes R201, R202, R203, and R204. Further, the reflected light R201 to R204 of the reflective faces 201 to 204 respectively is mixed and outputted from the first multi-beam interferometer 142. The optical intensity of each of the reflected light R201 to R204 is determined by the reflectance of the corresponding reflective faces 201 to 204. Furthermore, the relative temporal position of each of the reflected light R201 to R204 is determined by the temporal distance of the respective reflective faces 201 to 204. Therefore, by suitably setting the reflectance and temporal distance of each of the reflective faces 201 to 204, it is possible to obtain mixed reflected light (extended light) R1 that has a pulse width of at least the bit interval. The extended light R1 is sent to the half mirror 141.

As detailed above, the structure of the second multi-beam interferometer 143 is entirely the same as the structure of the first multi-beam interferometer 142. Therefore, the extended light R2 of a waveform that is the same as the extended light R1 (See FIG. 3) is outputted from the second multi-beam interferometer 143 to the half mirror 141.

As mentioned earlier, the round-trip optical path length between the half mirror 141 and first multi-beam interferometer 142 is shorter than the round-trip optical path length between the half mirror 141 and the second multi-beam interferometer 143 by one bit interval's worth of the time-division-multiplexed optical signal M1. Therefore, the extended light R1 corresponding with the respective bit signals (that is, the extended light generated by the first multi-beam interferometer 142) reaches the half mirror 141 at the same time as the extended light R2 that corresponds with the next bit signals (that is, the extended light generated by the second multi-beam interferometer 143). Therefore, the half mirror 141 always superimposes and outputs two consecutive bit signals. Further, as mentioned earlier, the time-division-multiplexed optical signal M1 is constituted by the optical signals S1 and S2 of two channels the carrier-wave phases of which are shifted with respect to one another. Therefore, the superimposed light M2 that is outputted from the half mirror 141 is a mixed wave of bit signals the carrier-wave phases of which do not match. In such a case, the optical intensity of the superimposed light M2 changes in accordance with the magnitude of the phase difference between the carrier waves.

Figure 4A:
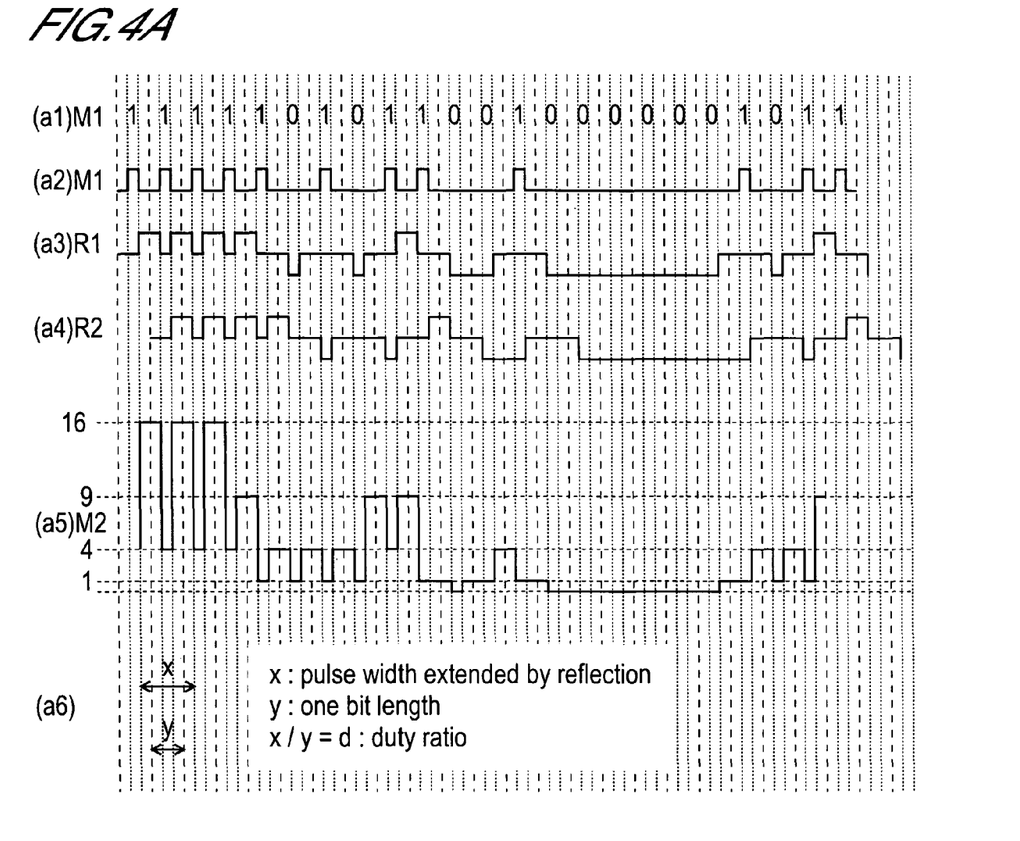
FIGS. 4A and 4B are schematic waveform diagrams which serve to illustrate the operation of the interferometer according to the first embodiment.
Figure 4B:
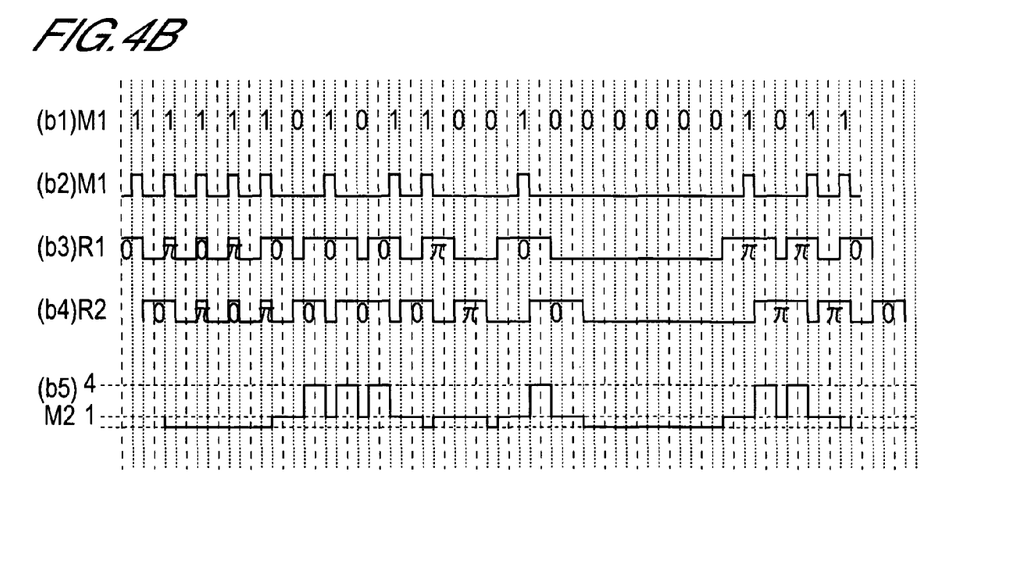

FIGS. 4A and 4B are schematic waveform diagrams which serve to illustrate the operation of the optical interference device 140.

Figure 5A:
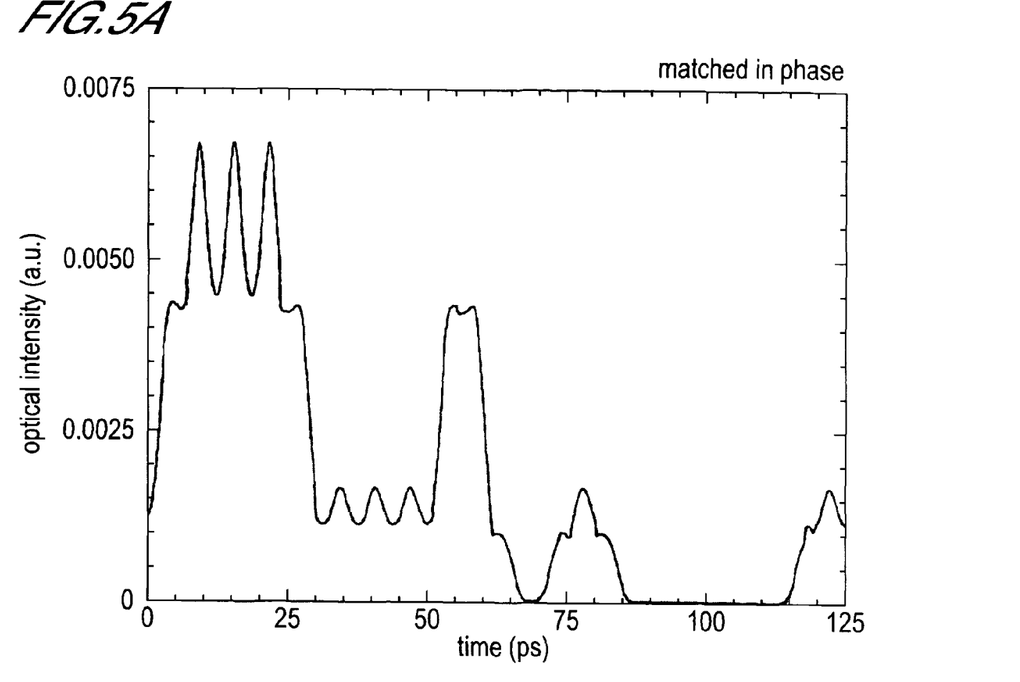
FIGS. 5A and 5B are waveform diagrams which serve to illustrate the operation of the interferometer according to the first embodiment.

FIG. 4A shows a case where the carrier-wave phases of the optical signals S1 and S2 are the same (that is, a case where the optical signals S1 and S2 are matched in phase). Further, in FIG. 4A, (a1) is the signal logic of the time-division-multiplexed optical signal M1 that is inputted to the interferometer and (a2) is the waveform of the time-division-multiplexed optical signal M1. As mentioned earlier, the first multi-beam interferometer 142 and second multi-beam interferometer 143 extend the pulse width of the time-division-multiplexed optical signal M1 (See (a6) in FIG. 4A). As a result, when logic value '1' continues, an overlap between adjacent bits is produced and the optical signal intensity rises. Therefore, the extended light R1 and R2 that is generated by the first multi-beam interferometer 142 and the second multi-beam interferometer 143 has the waveform denoted by (a3) and (a4) in FIG. 4A. The extended light R1 and R2 is superimposed by the half mirror 141. As a result, the superimposed light M2 that is outputted by the optical interference device 140 has the waveform denoted by (a5) in FIG. 4A. FIG. 5A is a portion of the result of simulating the actual waveform of the schematic superimposed wave denoted by (a5) in FIG. 4A. As shown in FIG. 5A, when the carrier-wave phases of the optical signals S1 and S2 are the same, the optical intensity of a part of consecutive '1's is extremely high.

Figure 5B:
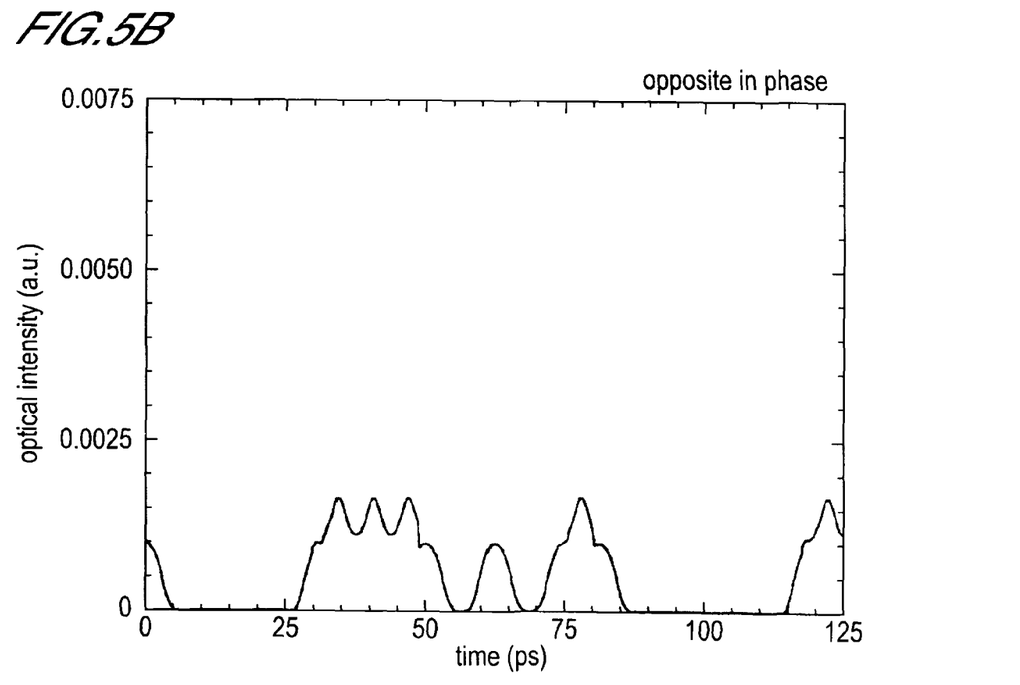

On the other hand, FIG. 4B shows a case where the carrier-wave phases of the optical signals S1 and S2 (See FIG. 1) are shifted by a half wavelength (that is, a case where the optical signals S1 and S2 are opposite in phase). As denoted by (b1) in FIG. 4B, the signal logic of the time-division-multiplexed optical signal M1 is the same as that of the case in FIG. 4A. Therefore, as denoted by (b2) in FIG. 4B, the waveform of signal M1 is also the same as that of the case in FIG. 4A. So too in this case, the first multi-beam interferometer 142 and second multi-beam interferometer 143 extend the pulse width of the time-division-multiplexed optical signal M1. Therefore, in the case of FIG. 4B, because the carrier-wave phases of adjacent bits are mutually shifted by a half wavelength, even when an overlap is produced between adjacent bits in parts having consecutive logic value '1's, carrier-wave phases of the adjacent bits cancel each other out. As a result, because the optical intensity of the overlapping part is zero, the extended light R1 and R2 generated by the first multi-beam interferometer 142 and the second multi-beam interferometer 143 respectively has the waveform denoted by (b3) and (b4) in FIG. 4B. In addition, in the case of FIG. 4B, when the extended light R1 and R2 is added by the half mirror 141, the bits of logic value '1' cancel one another out. As a result, the superimposed light M2 that is outputted by the optical interference device 140 has the waveform denoted by (b5) in FIG. 4B. FIG. 5B is a portion of the result of simulating the actual waveform of the schematic superimposed wave denoted by (b5) in FIG. 4B. As shown in FIG. 5B, when the carrier-wave phases of the optical signals S1 and S2 are the same, the optical intensity of a part of consecutive '1's is zero.

It can be seen from a comparison between FIGS. 5A and 5B that, when the carrier-wave phases are the same between adjacent bits, the average intensity of the superimposed light M2 is high in comparison with a case where the carrier-wave phases are shifted by a half wavelength. The specific calculation method of the average intensity will be described hereinbelow.

As mentioned earlier, in this embodiment, the pulse width of the optical signal bits reflected by the first multi-beam interferometer 142 (See FIG. 1) is split and, as a result, overlap the previous and subsequent bit. In addition, the extended light R2 of the previous bit is superimposed by the half mirror 141 on the extended light R1 that is thus generated. The extended light R2 also overlaps the bit before the previous bit (that is, the last but one bit of the extended light R1) and the bit following the previous bit (that is, the extended light R1). Therefore, the superimposed light M2 that is outputted from the half mirror 141 is affected by the last but one bit, the last bit and the next bit. As a result, the optical intensity of the extended light R1 is not only the signal logic of the extended light R1 and varies in accordance with the signal logic of the last but one bit, the last bit and the next bit. For this reason, the optical intensity of the extended light R1 acquires $2^4$ (=16) different values. In addition, the sixteen types of extended light intensity change in accordance with the phase shift of the carrier wave forming the optical signals S1 and S2 (See FIG. 1).

Here, in order to find the optical intensity of the extended light R1, the area of the optical waveform of the extended light R1 may be calculated. For example, the extended light intensity when the carrier-wave phases of adjacent signal bits are the same can be found from the waveform of FIG. 5A. Further, the extended light intensity when the carrier-wave phases of adjacent signal bits are shifted by a half wavelength can be found from the waveform of FIG. 5B. In addition, the extended light intensity corresponding with FIGS. 5A and 5B can be approximated by using (a5) in FIG. 4A and (b5) in FIG. 4B.

Figure 6:
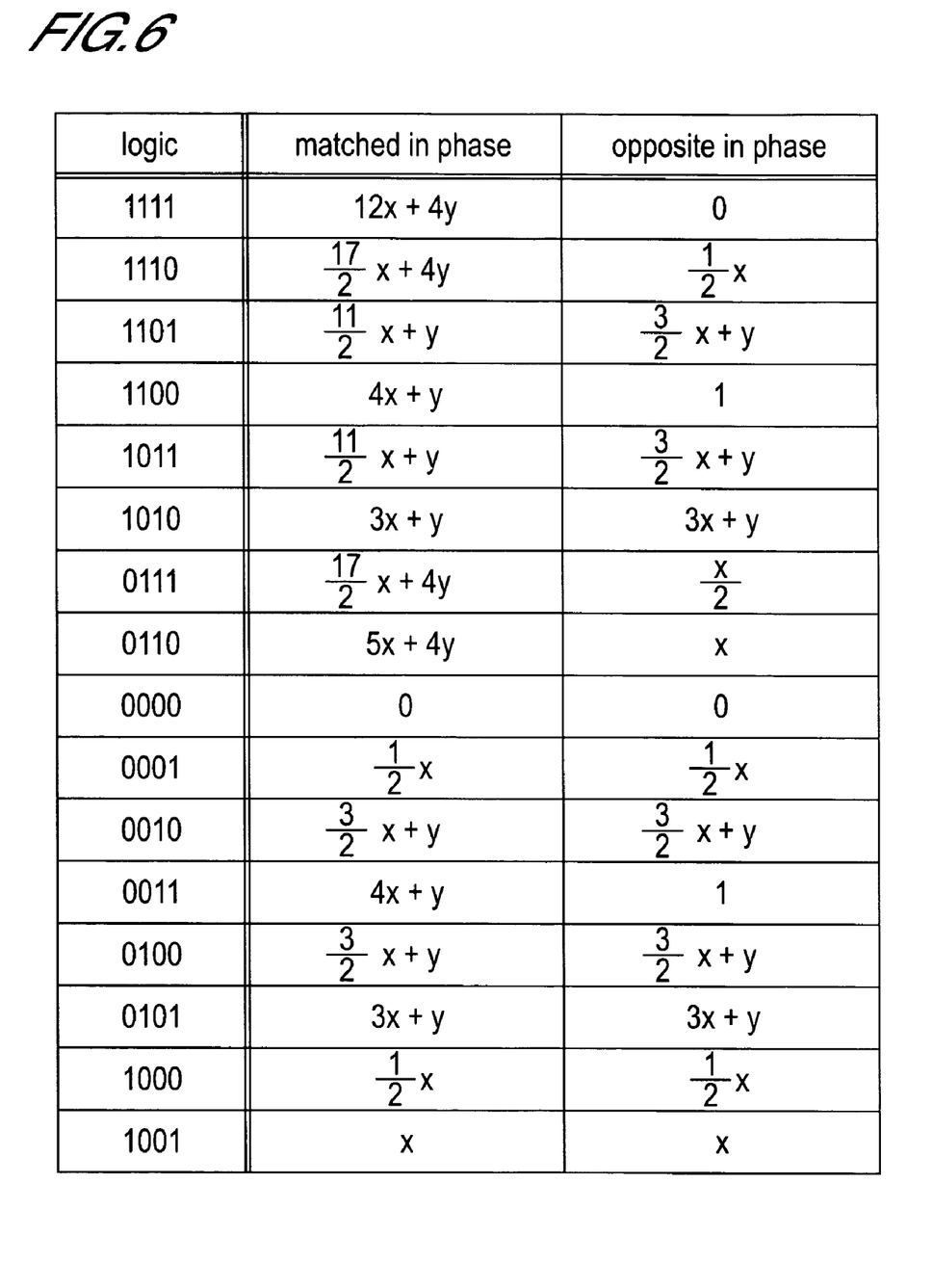
FIG. 6 is a chart that serves to illustrate the operation of the interferometer according to the first embodiment.

FIG. 6 is a table showing the results of approximating the optical intensity of the extended light R1 by using (a5) in FIG. 4A and (b5) in FIG. 4B. In FIG. 6, x is the pulse width of the extended light R1 and y is one bit length of the extended light R1 (12.5 picoseconds in the case of signal light of 80 Gbit/s, for example) (See (a6) in FIG. 4A).

The average intensity of the extended light R1 can be considered to be the average value of the above sixteen different extended light intensities. Therefore, in the example in FIG. 6, an average value I1 of the extended light intensity when the carrier-wave phases of adjacent signal bits are the same is given by Equation (1) below and an average value I2 when the carrier-wave phases are shifted by a half wavelength are given by Equation (2) below. Further, Equation (3) is given by Equations (1) and (2). Here, d is the duty ratio of the optical signal bits before and after extension and, therefore, d=x/y. As can be seen from Equation (3), the intensity ratio I1/I2 is dependent on the duty ratio d.

$$I1=64x+24y \quad (1)$$

$$I2=16x+8y \quad (2)$$

$$I1/I2=(64d+24)/(16d+8) \quad (3)$$

Figure 7A:
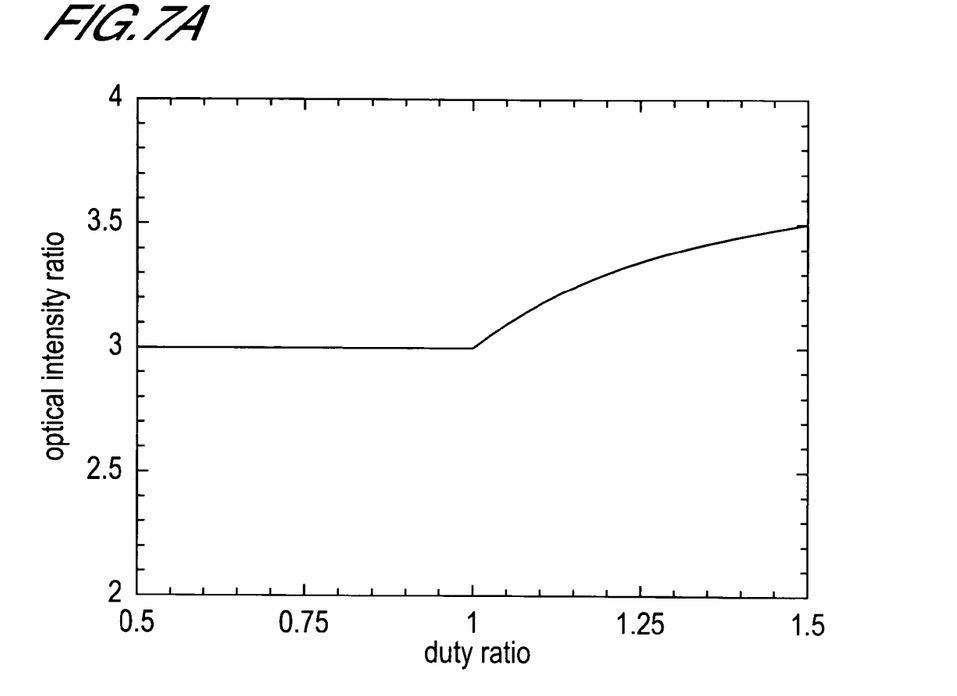
FIGS. 7A and 7B are graphs which serve to illustrate the operation of the interferometer according to the first embodiment.

FIG. 7A is a graph showing the relationship between the intensity ratio I1/I2 and the duty ratio d, where the vertical axis represents the intensity ratio I1/I2 and the horizontal axis is the duty ratio d. As is clear from FIG. 7A, when the duty ratio d is larger than '1', the intensity ratio I1/I2 increases with a dependence on the duty ratio d. As a result, when the pulse width of the optical signal bits is split by using the optical interference device 140 (that is, when the duty ratio d is larger than '1'), the intensity ratio I1/I2 is known to increase. As is clear from FIG. 7A, when the duty ratio d is 1.3, for example, the intensity ratio I1/I2 is approximately 3.4 (that is, 5.3 dB), and a sufficiently large intensity ratio I1/I2 is obtained.

Figure 7B:
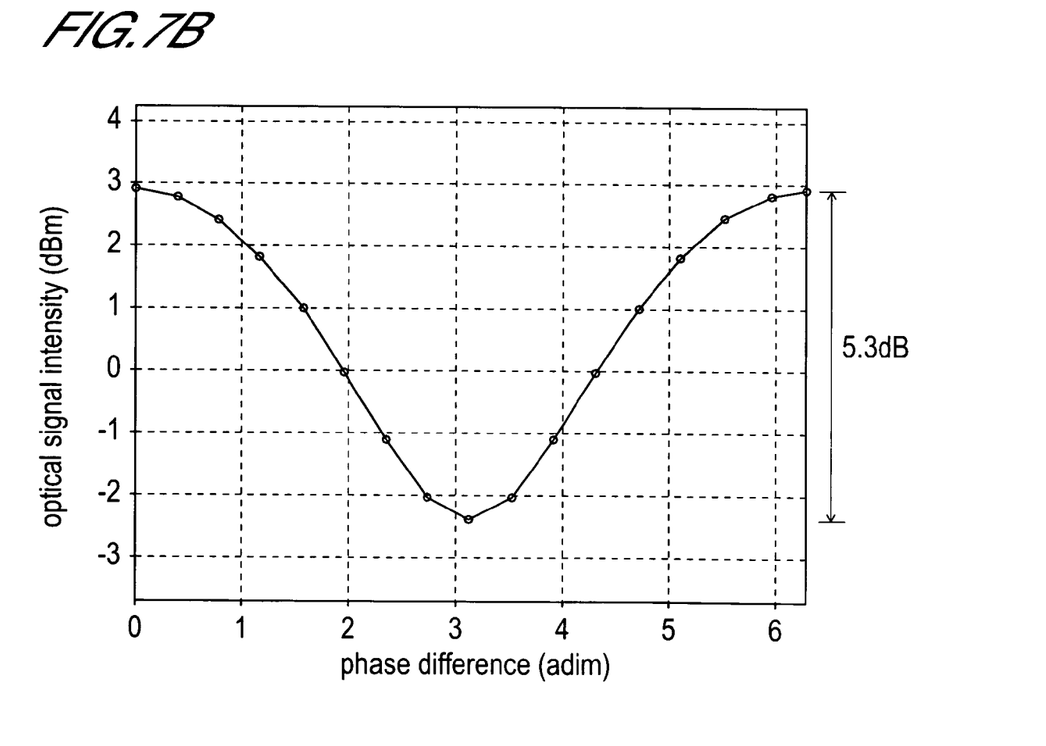

FIG. 7B is a graph showing an example of the relationship between the carrier-wave phase difference of adjacent signal bits and the optical signal intensity, where the vertical axis is the optical signal intensity [dBm] and the horizontal axis is the phase difference [adim]. As shown in FIG. 7B, in the case of the optical time division multiplexing transmitter 100 of this embodiment, the ratio between the extended light intensity when the carrier-wave phases of adjacent signal bits are the same and the extended light intensity when the carrier-wave phases are shifted by a half wavelength is 5.3 dB. Thus, in this embodiment, the change in the optical intensity with respect to the change in the carrier-wave phases increases and, therefore, the measurement accuracy of the carrier-wave phases can be easily improved.

As described hereinabove, the optical time division multiplexing transmitter 100 of this embodiment comprises the optical interference device 140 and, therefore, the carrier-wave phase difference between adjacent signal bits can be accurately detected.

Second Embodiment

The optical time division multiplexing transmitter of the second embodiment of the present invention will be described next by using FIG. 8.

This embodiment is an example in which an interferometer is constituted by using an FBG (Fiber Bragg Grating). The constitution of the other parts is the same as that of the first embodiment and a description of these parts is therefore omitted.

Figure 8:
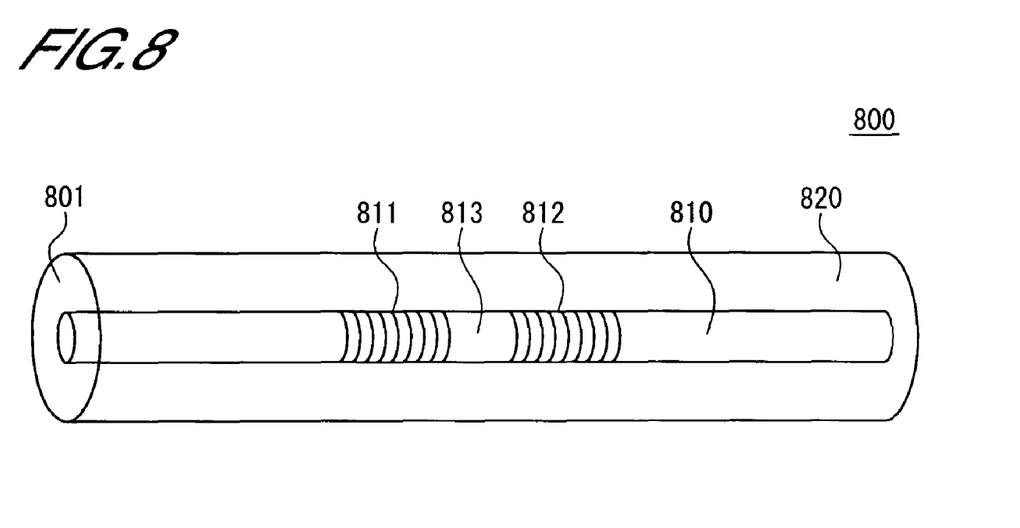
FIG. 8 is a conceptual view of the structure of the interferometer according to a second embodiment.

FIG. 8 is a conceptual view that conceptually shows the constitution of an interferometer 800 of this embodiment.

As shown in FIG. 8, the interferometer 800 comprises a Fiber Bragg grating 810 and a cover member 820 that covers the Fiber Bragg grating 810. Further, a first grating area 811 and a second grating area 812 are formed in the Fiber Bragg grating 810 with a phase shift area 813 interposed between the first grating area 811 and the second grating area 812.

The first grating area 811 and second grating area 812 comprise a plurality of reflective faces (See FIG. 2) similarly to the multi-beam interferometers 142 and 143 (See FIG. 1) of the first embodiment. Each reflective face reflects a portion of the time-division-multiplexed optical signal M1 and transmits the remainder.

The phase shift area 813 transmits the time-division-multiplexed optical signal M1 as is. The phase shift area 813 is provided in order to establish the difference in the round-trip optical path lengths between the optical input/output terminal 801 and the first and second grating areas 811 and 812 respectively. That is, the length of the phase shift area 813 is established so that the round-trip optical path length of light component being reflected at the first grating area 811 is shorter than the round-trip optical path length between of light component being reflected at the second grating area 812 by the one bit interval of the time-division-multiplexed optical signal M1.

The operating principles of the interferometer 800 shown in FIG. 8 will be described next.

The time-division-multiplexed optical signal M1 is outputted from the circulator 130 (See FIG. 1) and inputted from the input/output terminal 801 to the Fiber Bragg grating 810. The optical signal M1 reaches the first grating area 811. As mentioned earlier, portions the optical signal M1 are respectively reflected at the reflective faces of the grating 811. As a result, the reflected light component corresponding to the extended light R1 of the first embodiment is obtained. The optical signal component permeate through the first grating area 811 reaches the second grating area 812. Portions of the optical signal component is reflected by the respective reflective faces of the second grating area 812. As a result, the reflected light component corresponding to the extended light R2 of the first embodiment is obtained. Further, these reflected light components are mixed at the first grating area 811 and outputted from the optical input/output terminal 801.

As mentioned earlier, the round-trip optical path length between the optical input/output terminal 801 and first grating area 811 is shorter than the round-trip optical path length between the optical input/output terminal 801 and the second grating area 812 by one bit interval of the time-division-multiplexed optical signal M1. Therefore, the extended light R1 corresponding with each bit signal reaches the optical input/output terminal 801 at the same time as the extended light R2 corresponding with the previous bit signal. As a result, the optical input/output terminal 801 always superimposes and outputs two consecutive bit signals.

The other operations of the optical time division multiplexing transmitter of this embodiment are the same as those of the first embodiment and are therefore not described here.

As described earlier, because the optical time division multiplexing transmitter of this embodiment is provided with the interferometer 800, the carrier-wave phase difference between adjacent signal bits can be detected accurately as per the first embodiment.

In addition, because the interferometer 800 is constituted by a Fiber Bragg grating, there is the advantage that the structure is simple.

Although an optical time division multiplexing transmitter that multiplexes optical signals S1 and S2 of two channels was described by way of example in the embodiments described hereinabove, the present invention can also be applied to an optical time division multiplexing transmitter that multiplexes optical signals of four or more channels.

What is claimed is:

1. An optical time division multiplexing transmitter comprising:
    an optical time division multiplexer which generates time-division-multiplexed optical signals by time-division-multiplexing optical signals of a plurality of channels, the carrier-wave phases of which are shifted with respect to one another, the optical time division multiplexer including
    an optical splitter which splits an optical short-pulse train inputted from the outside into first and second carrier waves,
    a first optical modulator which generates a first optical signal by modulating the first carrier wave in accordance with a first electrical pulse signal inputted from the outside, and adjusts the phase of the first carrier wave,
    a second optical modulator which generates a second optical signal by modulating the second carrier wave in accordance with a second electrical pulse signal inputted from the outside, and adjusts the phase of the second carrier wave, and
    an optical coupler which generates a time-division-multiplexed optical signals by coupling the first optical signal and the second optical signal;
    an optical interference device which extends the pulse width of the time-division-multiplexed optical signals to a width equal to or more than the bit interval and superimposes the extended light of an adjacent bit on the extended light;
    an optical intensity detector which detects the intensity of the superimposed light outputted by the optical interference device; and
    a temperature regulator which adjusts the temperature of an optical waveguide provided in the first and second modulators so that the phase difference of the carrier waves constituting the adjacent optical signals is a half wavelength in accordance with the detection result of the optical intensity detector, wherein
    the phases of the first and second carrier waves are controlled by controlling the refractive index of the optical waveguide provided in the first and second modulators, and
    the refractive index of the optical waveguide is controlled by adjusting the temperature of the optical waveguide.

2. An optical time division multiplexing transmitter, comprising:
    an optical time division multiplexer which generates time-division-multiplexed optical signals by time-division-multiplexing optical signals of a plurality of channels, the carrier-wave phases of which are shifted with respect to one another;
    an optical interference device which extends the pulse width of the time-division-multiplexed optical signals to a width equal to or more than the bit interval and superimposes the extended light of an adjacent bit on the extended light; and
    an optical intensity detector which detects the intensity of the superimposed light outputted by the optical interference device, wherein the optical interference device comprises
    a half mirror which splits the time-division-multiplexed optical signals into two;
    a first multiple-beam interferometer which generates the extended light from one split time-division-multiplexed optical signal and sends the extended light back to the half mirror; and
    a second multi-beam interferometer which generates the extended light from the other split time-division-multiplexed optical signal and sends the extended light back to the half mirror.

3. The optical time division multiplexing transmitter according to claim 2, wherein the first and second multi-beam interferometers are arranged so that the round-trip optical path lengths between the half mirror and the first and second multi-beam interferometers respectively are shifted by one bit interval's worth of the time-division-multiplexed optical signal.

4. The optical time division multiplexing transmitter according to claim 2, wherein the optical interference device comprises a Fiber Bragg grating that has a first grating area that generates the extended light from the time-division-multiplexed optical signal and a second grating area that generates the extended light from the time-division-multiplexed optical signal that has passed through the first grating area.

* * * * *